United States Patent [19]

Vindum

[11] Patent Number: 4,830,331
[45] Date of Patent: May 16, 1989

[54] HIGH PRESSURE FLUID VALVE

[76] Inventor: Jorgen O. Vindum, 1 Woodview Ct., San Ramon, Calif. 94583

[21] Appl. No.: 223,276

[22] Filed: Jul. 22, 1988

[51] Int. Cl.[4] .................. F16K 31/122; F16K 47/04
[52] U.S. Cl. .................................. 251/63; 137/883;
                                              137/885; 251/63.5; 251/122
[58] Field of Search ............... 137/883, 885; 251/31,
                                              251/63, 63.5, 121, 122

[56]         References Cited
         U.S. PATENT DOCUMENTS

|  |  |  |  |
|---|---|---|---|
| 938,601 | 11/1909 | Maas | 251/122 |
| 3,026,896 | 3/1962 | Bosworth et al. | 251/63 |
| 4,391,293 | 7/1983 | Keenan | 251/63.5 |
| 4,525,183 | 6/1985 | Cordes et al. | 251/63.5 |
| 4,726,933 | 2/1988 | Mayr et al. | 137/885 |

FOREIGN PATENT DOCUMENTS

|  |  |  |  |
|---|---|---|---|
| 2338912 | 2/1975 | Fed. Rep. of Germany | 251/63.5 |
| 1110348 | 2/1956 | France | 251/63.5 |
| 577132 | 5/1946 | United Kingdom | 137/885 |
| 1303435 | 1/1973 | United Kingdom | 251/63.5 |

*Primary Examiner*—George L. Walton

[57]         ABSTRACT

A high pressure fluid valve includes a tubular portion with a valve seat on its end and a closure element for engaging the valve seat. A piston carries either the tubular portion or the closure element as a movable valve member, with the other being fixed. A first fluid chamber is provided adjacent the valve seat and a second fluid chamber is spaced therefrom adjacent the other end of the movable valve member. When the movable valve member is actuated, one of the fluid chambers increases in volume by the same amount that the other decreases in volume, thereby maintaining the internal volume of the valve constant.

10 Claims, 3 Drawing Sheets

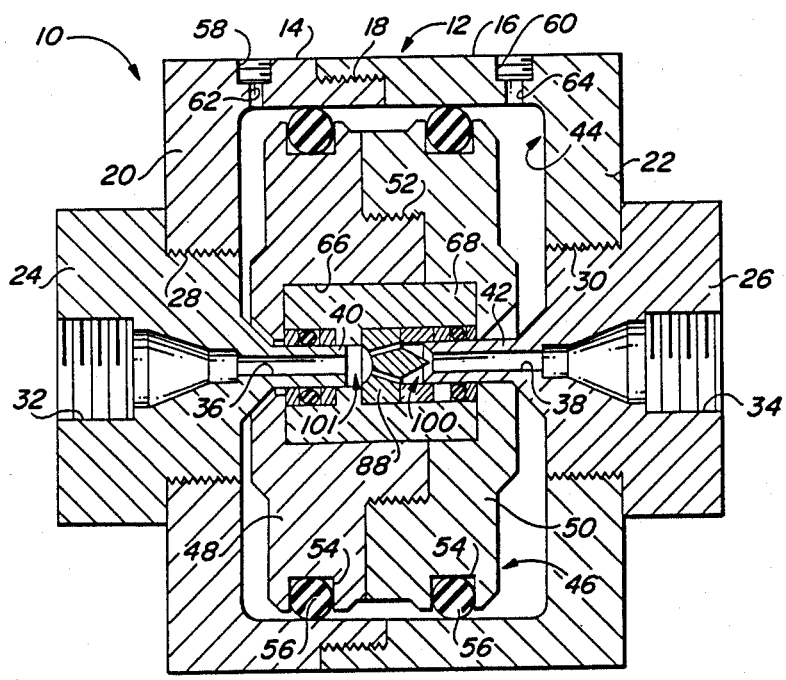
FIG-1
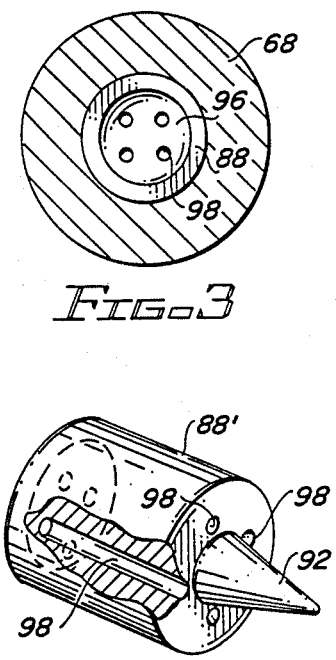
FIG-3
FIG-4
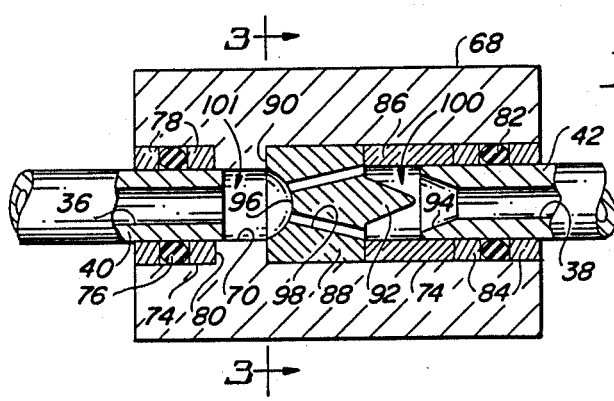
FIG-2
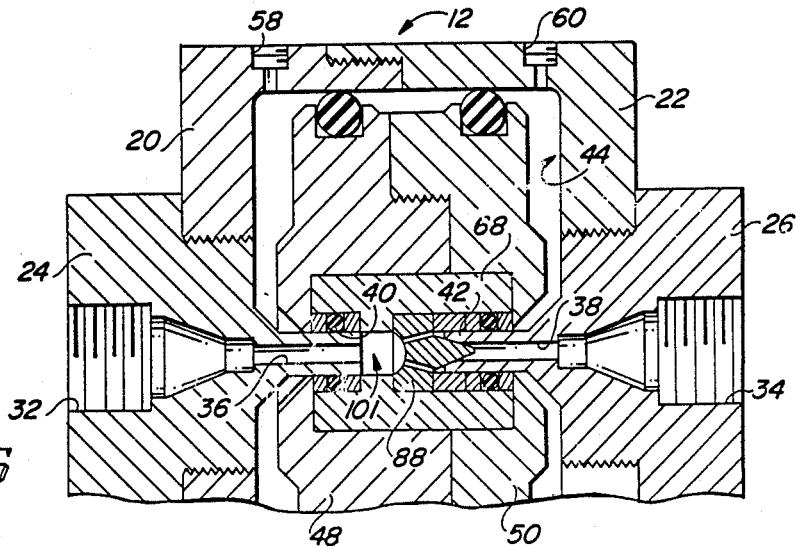
FIG-5

HIGH PRESSURE FLUID VALVE

FIELD OF THE INVENTION

This invention relates to fluid valves. More particularly, it relates to a valve which can be used in systems designed to measure extremely small pressure changes, volume changes and flow differences in high pressure fluids.

BACKGROUND OF THE INVENTION

It is necessary in certain types of laboratory analysis work to accurately measure pressure changes, volume changes and fluid flow in a high fluid pressure system. In fine core analyses conducted in the oil industry, for example, the system pressures are commonly in the order of 10,000 psi, while the changes in pressure, volume and flow which must be measured are very small. Pressure changes are measured to a fraction of a psi, volume changes are measured in thousandths of a cc and flow changes are measured in thousandths of a cc per minute.

Valves currently available suffer from one or more problems. In most cases the internal volume of the valve changes upon opening and closing of the valve. In other words, the structure of the movable component of the valve increases or decreases the volume of the flow path through the valve depending upon whether the valve is open or closed. As a result, the pressure of the fluid and the total volume in the system changes. Since extremely small changes in pressure and volume can be significant, even small changes in the volume of the system can cause erroneous readings, leading to erroneous conclusions about the core sample.

In addition, most valves available for use in such systems do not give flexibility of operation when incorporated in a multiple valve. In a three-way valve, for example, it can be desirable to be able to close both outlets or open them both, which is not possible with currently available valves. Further, most valves used in such systems are quite expensive.

It would therefore be desirable, in the measurement of small fluctuations in pressure, volume and flow in a high pressure fluid system, to use a valve that maintains a constant internal volume so as not to produce false pressure readings. It would also be desirable that such a valve be economical and capable of a full range of settings when used in a multi-valve arrangement.

SUMMARY OF THE INVENTION

This invention provides a valve comprising a movable member and a fixed member, one of the members including a fluid passageway terminating in an annular valve seat and the other member comprising a closure element adapted to engage the valve seat to stop fluid flow through the passageway. Means are provided for moving the movable valve member to cause the closure element to be either engaged with the valve seat or spaced therefrom. The fluid path includes a first fluid chamber adjacent the valve seat and a second fluid chamber spaced from the first chamber. The movable member is designed to move into the first fluid chamber as the valve is closed to decrease the volume of the first fluid chamber. In addition, means are provided for increasing the volume of the second fluid chamber as the valve is closed by an amount corresponding to the amount by which the first fluid chamber is decreased. The internal volume of the valve thus remains substantially the same during activation of the valve.

Although any suitable means for moving the movable valve member may be employed, a piston is the preferred means because it fits well into a computer controlled system. The piston contains an aperture in which the movable valve member is located for movement with the piston. The fluid path of the valve would thus extend through the piston.

The valve can be designed so that the movable member comprises either the valve closure element or the fluid passageway which contains the valve seat, or it can be designed as a combination of the two. In one embodiment, the movable valve member comprises a body portion containing a bore which slidably receives opposed tubular portions leading to the inlet and outlet of the valve. The closure element is located within the body portion between the ends of the tubular portions, one of which contains the valve seat. The volume of the first fluid chamber is changed by movement of the closure element with respect to the tubular element containing the valve seat, and the volume of the second fluid chamber is changed by movement of the closure element with respect to the other tubular portion, whereby movement of the closure element toward the valve seat decreases the volume of the first chamber and increases the volume of the second chamber.

In another embodiment the movable valve member comprises a tubular portion containing the fluid passageway which carries the valve seat. The tubular portion is slidably mounted in aligned bores leading to the inlet and outlet. The volumes of the first and second chambers are changed by movement of the tubular portion with respect to the fixed closure element, whereby movement of the tubular portion toward the closure element decreases the volume of the first chamber and increases the volume of the second chamber.

In addition, a third embodiment which combines features of the two embodiments just described can be utilized.

Because of the valve construction, the surfaces of the valve exposed to fluid are kept to a minimum, thereby minimizing the use of expensive corrosion resistant materials. Also, the valve design allows it to be incorporated in multi-valve arrangements wherein each valve can be set in open or closed condition as desired.

Other features an aspects of the invention, as well as other benefits, will readily be ascertained from the more detailed description of the invention which follows.

BRIEF DESCRIPTION OF THE DRAWINGS

FIG. 1 is a longitudinal sectional view of a two-way valve in open condition, illustrating one embodiment of the invention;

FIG. 2 is an enlarged longitudinal sectional view of the movable body member containing the closure or sealing element;

FIG. 3 is a transverse sectional view of the sealing element taken on line 3—3 of FIG. 2;

FIG. 4 is a partial pictorial view of the movable body member illustrated in FIGS. 2 and 3;

FIG. 5 is a partial longitudinal sectional view of the valve shown in FIG. 1, but showing the valve in closed condition;

DESCRIPTION OF THE PREFERRED EMBODIMENTS

Figure 6:
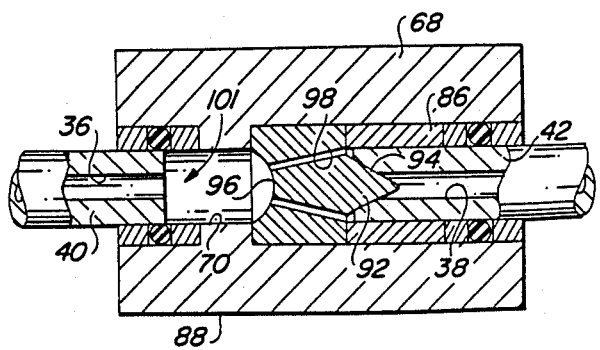
FIG. 6 is an enlarged longitudinal sectional view similar to that of FIG. 2, but showing the valve in closed condition.

Referring to FIG. 1, a valve 10 is comprised of a main body 12 consisting of cylindrical portions 14 and 16 connected to each other by threads 18. The cylindrical portions 14 and 16 include end portions 20 and 22, respectively, which extend radially inwardly toward end sections 24 and 26 and are connected thereto by threaded connections 28 and 30. Extending from the central portions of the end sections 24 and 26 are ports 32 and 34 adapted to receive threaded fluid connectors, not shown. The ports 32 and 34 are connected to bores 36 and 38, respectively, which extend through tubular extensions 40 and 42. The tubular extensions 40 and 42, which are of the same cross-sectional dimensions, also extend centrally of the end sections 24 and 26, and the bores therein are axially aligned with each other.

The enclosure formed by the cylindrical portions 14 and 16, the end portions 20 and 22, and the end sections 24 and 26 comprises a chamber 44 in which a piston 46 is mounted for reciprocal movement. The piston 46 comprises two halves 48 and 50 connected to each other by threaded connection 52. Each half piston section contains a peripheral groove 54 in which an O-ring 56 is seated. The end portions 20 and 22 contain ports 58 and 60 connected to bores 62 and 64 which permit pressurized fluid, such as air, to be admitted to the chamber 44 to move the piston 46 in the chamber toward and away from the bores 36 and 38. Each piston half 48 and 50 contains a centrally located bore which meets with the other bore to form a centrally located cavity 66 in which a cylindrical body 68 is fitted.

As shown generally in FIG. 1, and in more detail in FIG. 2, the cylindrical body 68 includes a relatively short axial bore 70 intermediate the ends of the body 68, the bore 70 being dimensioned so as to slidably receive the tubular extension 40. The rest of the body is counterbored as at 74 to a larger diameter. This arrangement enables O-ring 76 to be installed as part of an assembly in which the O-ring is sandwiched between back-up rings 78 at the left counterbore 74, wherein the inner back-up ring 78 abuts a shoulder 80 connecting the bore 70 and the left counterbore 74. A similar assembly including O-ring 82 and back-up rings 84 is installed in the right counterbore at the other end of the cylindrical body, but in this case the inner back-up ring 84 abuts one end of a retaining ring 86. The other end of the retaining ring 86 abuts one end of a sealing plug 88 which is sandwiched between the retaining ring 86 and the shoulder 90 connecting the bore 70 and the right counterbore 74.

As shown in FIGS. 2, 3 and 4, the sealing plug 88 comprises a cylindrical body from which a conical sealing element 92 extends. The sealing element is located centrally of the cylindrical body and is aligned with the bore 38 of tubular extension 42, being adapted to seat in the end portion of tubular extension 42. The slope of the cone is similar to the slope of the seat 94 at the end of the tubular extension 42 so as to form a fluid tight seal when the cone engages the end of the tubular extension. The opposite end of the sealing plug includes a centrally located dished portion forming a recess 96. Bores 98 in the sealing plug 88 provide fluid passages between the recess 96 and the opposite end of the sealing plug adjacent the base of the cone 92.

Referring to FIGS. 1 and 2, either port 32 or 34 may function as the inlet while the other port would function as the outlet. Assuming for the sake of illustrating the operation of the valve that system fluid is introduced into port 34, it will flow through the bore 38 and into a chamber 100 defined by the cone 92, the end portions of the sealing plug 88 surrounding the cone, the end of the tubular extension 42 and the surrounding portions of the retaining ring 86. For purpose of discussion and according to the terminology used in the claims, this chamber will be referred to as the first fluid chamber. The system fluid will then flow out the first fluid chamber, through the bores 98, and into a second fluid chamber 101 defined by the recess 96 of the sealing plug, the end of the tubular extension 40 and the surrounding portions of the bore 70. The fluid will then continue through the bore 36 and out the outlet port 32.

To close the valve, pressurized air would be introduced into the piston chamber 44 through port 58. The air introduced would remain on the left side of the piston as seen in FIG. 1, due to the sealing action of the left O-ring 56. The force of the air pressure moves the piston to the right, exhausting air from the right side of the piston chamber through the port 60. As the piston is moved toward the right, the cylindrical body 68 is moved with it, causing the conical sealing element 92 to engage the valve seat 94 at the end of the tubular extension 42 to close the fluid path at the end of the tubular extension. The positions of the various elements at this stage are shown in FIGS. 5 and 6.

It can be seen, particularly by comparing FIGS. 2 and 6, that the movement to the right by the cylindrical body 68 causes the sealing plug 88 to move away from the fixed end of the tubular extension 40, thus increasing the volume of the second fluid chamber 101. The same movement causes the conical sealing element 92 to move closer to, and eventually engage, the seat 94 at the fixed end of the tubular extension 42, thus decreasing the volume of the first fluid chamber 100. By making the outside and inside diameters of the tubular extension 40 the same as the outside and inside diameters of the tubular extension 42, the amount that the volume of the first fluid chamber 100 has been decreased at any moment during movement of the sealing plug 88 and the conical sealing element 92 in a direction toward the end of the tubular extension 42 will be equal to the amount that the volume of the second fluid chamber 101 has been increased. Therefore, the internal volume of the valve at any moment, whether the sealing member is stationary or moving, remains the same.

Figure 7:
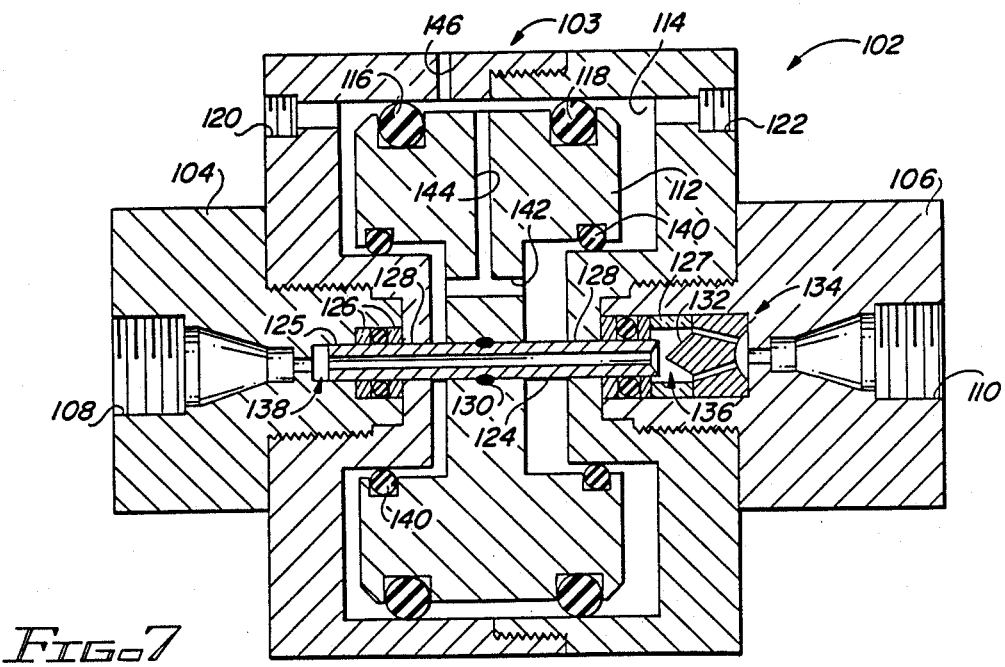
FIG. 7 is a longitudinal sectional view of a different two-way valve in open condition, illustrating a second embodiment of the invention.

In the arrangement described, the movable sealing assembly slides over the tubular extensions of the end sections of the valve body. The design can be reversed, however, to make the movable component slide within bores in the end sections. Referring to FIG. 7, the valve 102 illustrates such an arrangement. A main body portion 103, generally similar to the body 12 of the FIG. 1 design, is connected to end sections 104 and 106 which contain ports 108 and 110, respectively. A piston 112 is positioned in the chamber 114 for reciprocal movement therein, and O-rings 116 and 118 seal the chamber to allow pressurized air to enter and exhaust from ports 120 and 122.

Still referring to FIG. 7, instead of tubular portions extending toward each other from the end sections, as in the first embodiment described, the end sections 104 and 106 contain bores or sockets for receiving the end portions of tube 124. Thus end section 104 contains bore 125 and counterbore 126, which are similar in function to the bore 70 and counterbore 74 in the first embodiment. End section 106 contains bore 127 for receiving a sealing plug and retaining ring arrangement similar to the sealing plug 88 and retaining ring 86 previously described. The tube 124, which is of constant cross-sectional dimensions throughout its length, extends into the end sections 104 and 106 through centrally located openings 128 in the main body portion 103. The tube 124 is connected to the piston 112 for movement therewith by any suitable means, such as by brazing, indicated for purpose of illustration by reference numeral 130. A fixed conical sealing element 132 is mounted in the bore 126 in the end section 106 in axial alignment with the tube 124 so that the adjacent end of the tube can be moved into engagement with the element 132. The end of the tube functions as a valve seat, as in the arrangement of FIG. 1, so that engagement with the sealing element 132 stops fluid flow through the tube. The sealing element 132 may be part of a sealing plug 134 similar to the sealing module 86 of FIGS. 1–5.

Figure 8:
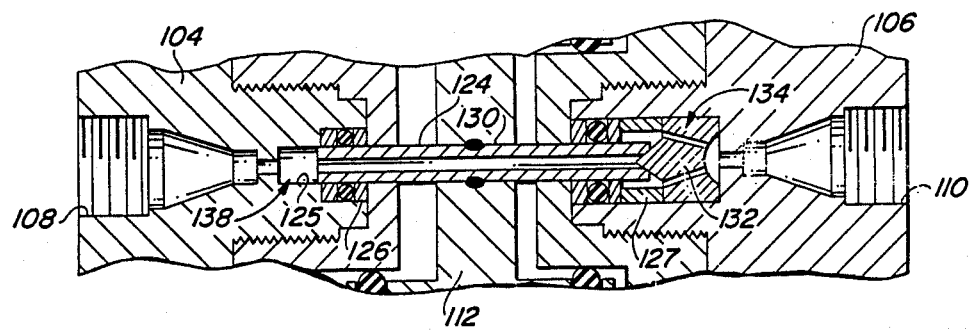
FIG. 8 is a partial longitudinal sectional view of the valve shown in FIG. 7, but showing the valve in closed condition.

As in the first embodiment, this embodiment has a first fluid chamber 136, defined by the same type of structure which defines the first fluid chamber 100 in the first embodiment, and a second fluid chamber 138, which is defined by the end of the tube 124, and the end and surrounding portions of the bore 125 in the end section 104. In operation, when the piston 112 is actuated to move from the open valve position in FIG. 7 to the closed valve position in FIG. 8, the first fluid chamber 136 is reduced in volume by an amount similar to the amount that the second fluid chamber 138 is increased in volume. This is due to the inside and outside diameters of the end portions of the tube 124 being respectively equal. The total fluid volume of the valve thus remains unchanged as in the embodiment of FIGS. 1–5.

Another feature of the invention is illustrated in FIG. 7, wherein O-rings 140 engage the surface of inwardly directed cylindrical stubs extending from the end portions of the valve body 102 to seal off the annular space adjacent the movable tube 128. A bore 142 in the piston 112 connects the annular space on opposite sides of the piston, and a bore 144 connects the bore 142 with the annular space between the periphery of the piston and the interior cylindrical surface of the valve body. A bore 146 in the valve body completes the fluid path. This arrangement provides a flow path for system fluid which may leak into the piston chamber. Such fluid would thus be prevented by this arrangement from entering the portions of the piston chamber containing pressurized air. Although described in connection with the embodiment of FIGS. 7 and 8, it is obvious that a similar leak path could be provided in the first embodiment by altering the shape of the end sections and the piston.

Figure 9:
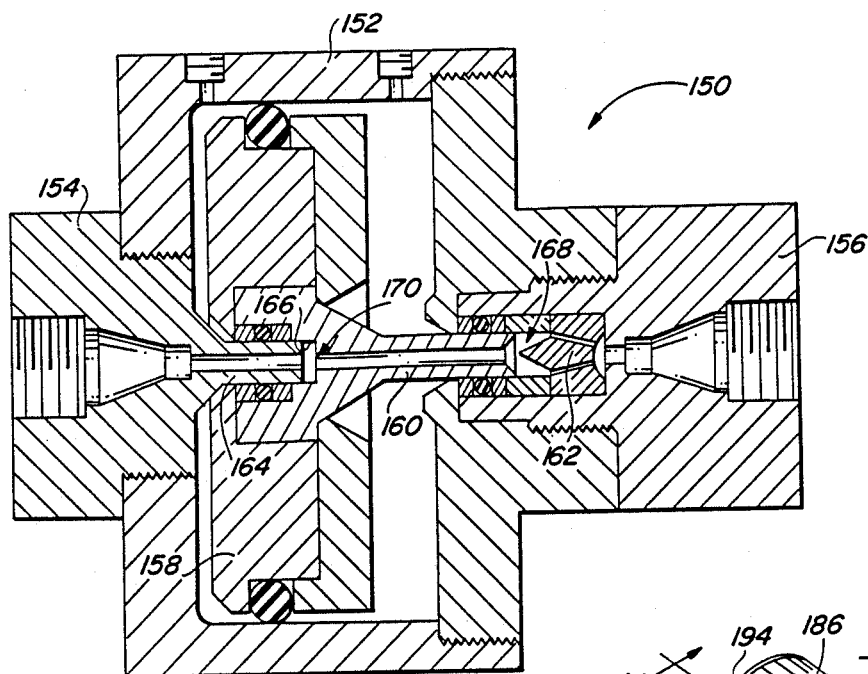
FIG. 9 is a longitudinal sectional view of another two-way valve in open condition, illustrating a third embodiment of the invention.

Referring to FIG. 9, a third embodiment is illustrated by the valve 150 which comprises a main body portion 152, end sections 154 and 156, and a piston 158. The design of this embodiment combines certain features of the first two embodiments by providing a movable tubular portion 160 and co-acting fixed conical sealing element 162, as in the FIG. 7 arrangement, and a tubular extension 164 fitting into a socket or bore 166 in the piston, as in the FIG. 1 arrangement. The chamber 168, similar to the chamber 136 in the FIG. 7 arrangement, is the first chamber and the chamber 170, similar to the chamber 101 in the FIG. 1 arrangement, is the second chamber.

The embodiment of FIG. 9 functions in the same general manner as the other embodiments, with the piston 158 causing the seat in the end of the tubular portion 160 to engage or disengage the sealing element 162 in order to close or open the valve. Due to the inside and outside diameters of the end portions of tubes 160 and 164 being respectively equal, the chambers 168 and 170 correspondingly decrease or increase in volume so as to maintain the internal volume of the valve constant at all times. As in the arrangement of FIG. 7, a leak path could also be provided in this design.

Figure 11:
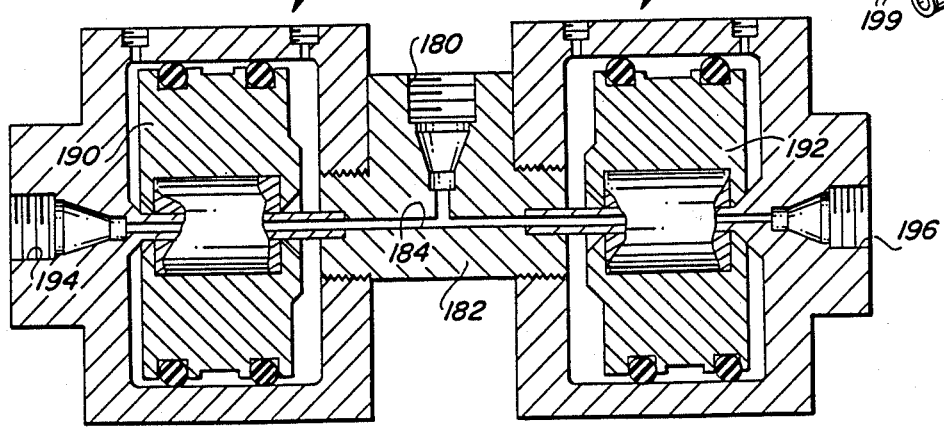
FIG. 11 is a longitudinal sectional view of a three-way valve incorporating the movable valve body design of FIG. 1.

FIG. 11 shows a typical three-way valve utilizing the valve design of the present invention. In this arrangement fluid is admitted through the inlet 180 in central body portion 182, from which it flows through bore 184 into valves 186 and 188. These valves may be of any of the designs of the various embodiments of the invention and, depending on the position of the pistons 190 and 192 thereof, will either permit or prevent flow through the outlets 194 and 196. It will readily be seen that the design of the invention permits the valves 186 and 188 to be operated in any desired sequence so that either or both valves can be opened or closed at any time independent of the operation of the other.

Figure 10:
FIG. 10 is a pictorial view showing the exterior of a typical three-way valve incorporating the valve of the present invention.

A three-way valve such as that shown in FIG. 11 would typically appear as in FIG. 10, wherein the valves 186 and 188 may be formed flush with the body portion 182 to provide an overall valve assembly which is convenient to handle. The valves in this case are shown with air line attachment assemblies 198 leading into valve 186 and attachment assemblies 199 leading into valve 188.

Figure 12:
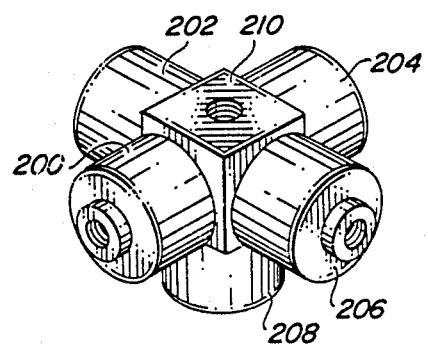
FIG. 12 is a pictorial view showing the exterior of a five-valve configuration incorporating the valve of the present invention.

A number of valves may be connected together to form multi-valve arrangements. For example, in FIG. 12 five valves 200, 202, 204, 206 and 208 are shown connected to a common inlet 210 in a typical modular arrangement. It will be understood that any number of valves may be strung together in connection with a common inlet or outlet as required to provide for controlled multiple valve operation.

While various designs have been described, the final choice of design may well be dictated by the ease and cost of assembly. In this connection, the piston, the valve body and the sealing assemblies have been illustrated as being comprised of components secured together by threaded connections which permit the various parts to be readily assembled. Since each embodiment described operates on the same basic principles, each will provide the same function and can be used interchangeably if desired.

Although the sealing element has been illustrated as a conical element, it could just as well be any other shape, such as flat or arcuate, which will effectively engage the valve seat and provide the desired sealing function. This element may be comprised of any suitable material such as plastic, metal or rubber, as long as it functions in the desired manner and is resistant to the effects of corrosive fluids in the system.

Although the preferred means for moving the movable sealing elements is a piston because its operation lends itself to computer control and because it is fast acting, other means such as solenoids or even manually controlled movement of the sealing assembly may be employed.

Although the sealing plug and retaining ring assembly shown in the drawings is preferred because the parts can be replaced if worn and because it lends itself to easy assembly in the valve, it will be appreciated that there are other sealing element designs which may or may not involve a sealing plug and retaining ring arrangement of the type described. Similarly, the design of the first and second fluid chambers, whose volumes change so as to maintain the internal volume of the valve constant, need not be specifically as shown so long as the relationship between the two enables a constant valve volume to be maintained.

It should now be understood that the invention is not necessarily limited to all the specific details of the preferred embodiments but that changes to certain features of the preferred embodiment which do not alter the overall basic function and concept of the invention may be made by those skilled in the art without departing from the spirit and scope of the invention, as defined in the appended claims.

What is claimed is:

1. A high pressure fluid valve, comprising:
   a fluid inlet;
   a fluid outlet;
   a fluid path connecting the inlet and outlet;
   said inlet and outlet including fluid passageway extensions extending therefrom;
   valve means in the fluid path comprising a movable member and fixed member;
   one of the valve members including one of said fluid passageway extension terminating in an annular valve seat and the other member including a closure element adapted to engage the valve seat to stop fluid flow through the passageway;
   means for moving the movable member toward and away from the fixed member to cause the closure element to be moved into and out of engagement with the valve seat;
   the movable member and the fixed member, when spaced apart, defining portions of a first fluid chamber in the fluid path;
   the movable member including a portion remote from the valve means, said remote portion defining a portion of a second fluid chamber in the fluid path;
   said means for moving the movable valve member comprising a piston chamber, a plurality of piston sections, said piston sections including a plurality of cavities therein, said piston sections being connected together and mounted for movement in the piston chamber in the direction of movement of the movable valve member by actuator means, a body member being disposed within said cavities when said piston sections are connected together, said body member including said first and second fluid chambers for receiving said annular valve seat and said closure element in one of said fluid chambers and the other of said fluid passageway extensions being disposed in the other of said fluid chambers; and
   means including said actuator means for increasing the volume of the second fluid chamber during relative movement of the closure element toward the valve seat by an amount corresponding to the amount by which the first fluid chamber is decreased, whereby the internal volume of the valve remains substantially the same during activation of the valve.

2. A valve according to claim 1, wherein the means for increasing the volume of the second fluid chamber during relative movement of the closure element toward the valve seat by an amount corresponding to the amount by which the first fluid chamber is decreased comprises a first annular wall surrounding the fluid passageway adjacent the annular valve seat, and a second annular wall surrounding a fluid passageway communicating with the second fluid chamber, the transverse cross-sectional areas the first and second annular walls being substantially equal.

3. A valve according to claim 1, wherein the actuator means includes fluid inlet and outlet means in the piston chamber between the piston sections and the piston chamber to permit fluid under pressure to be introduced into the piston chamber to move the piston sections.

4. A valve according to claim 1, wherein a portion of the fluid path extends around the closure element to connect the first and second fluid chambers.

5. A high pressure fluid valve, comprising:
   a fluid inlet;
   a fluid outlet;
   a fluid path connecting the inlet and outlet;
   said inlet and outlet including fluid passageway cavities connected thereto;
   valve means in the fluid path comprising a movable member and a fixed member;
   one of the valve members including a first fluid passageway extension terminating in an annular valve seat and the other member including a closure element disposed in one of the cavities and being adapted to engage the valve seat to stop fluid flow through the passageway;
   means for moving the movable member toward and away from the fixed member to cause the closure element to be moved into and out of engagement with the valve seat;
   the movable member and the fixed member, when spaced apart, defining portions of a first fluid chamber in the fluid path;
   the movable member including a portion remote from the valve means, said remote portion defining a portion of a second fluid chamber in the fluid path;
   said means for moving the movable valve member comprising a piston chamber, a piston, said piston including said first fluid passageway extension and a second fluid passageway extension extending therefrom, said piston being mounted for movement in the piston chamber in the direction of movement of the movable valve member by actuator means, said first and second cavities including, respectively, said first and second fluid chambers, the annular valve seat of the first fluid passageway extension and said closure element being received in the first fluid chamber and the second fluid passageway extension being disposed in the second fluid chamber; and means including said actuator means for increasing the volume of the second fluid chamber during relative movement of the closure element toward the valve seat by an amount corresponding to the amount by which the first fluid chamber is decreased, whereby the internal volume of the valve remains substantially the same during activation of the valve.

6. A valve according to claim 5, wherein the means for increasing the volume of the second fluid chamber during relative movement of the closure element toward the valve seat by an amount corresponding to the amount by which the first fluid chamber is decreased comprises a first annular wall surrounding the fluid passageway adjacent the annular valve seat, and a second annular wall surrounding a fluid passageway communicating with the second fluid chamber, the transverse cross-sectional areas of the first and second annular walls being substantially equal.

7. A valve according to claim 5, wherein the actuator means includes fluid inlet and outlet means in the piston chamber between the piston and the piston chamber to permit fluid under pressure to be introduced into the piston chamber to move the piston.

8. A high pressure fluid valve, comprising:
a fluid inlet;
a fluid outlet;
a fluid path connecting the inlet and outlet;
one of either in the inlet and outlet including a first fluid passageway extension extending therefrom and the other of either the inlet and outlet including a first fluid passageway cavity connected thereto;
valve means in the fluid path comprising a movable member and a fixed member;
one of the valve members including a second fluid passageway extension terminating in an annular valve seat and the other member including a closure element adapted to engage the valve seat to stop fluid flow through the passageway;
means for moving the movable member toward and away from the fixed member to cause the closure element to b moved into and out of engagement with the valve seat;
the movable member and the fixed member, when spaced apart, defining portions of a first fluid chamber in the fluid path; the the movable member including a portion remote from valve means, said remote portion defining a portion of a second fluid chamber in the fluid path;

said means for moving the movable valve member comprising a piston chamber, a piston, said piston including said second fluid passageway extension extending therefrom and further including a second fluid cavity therein, said piston being mounted for movement in the piston chamber in the direction of movement of the movable valve member by actuator means, said first and second cavities including, respectively, said first and second fluid chambers, the annular valve seat of the second fluid passageway extension and said closure element being received in the first fluid chamber and the first fluid passageway extension being disposed in the second fluid chamber; and means including said actuator means for increasing the volume of the second fluid chamber during relative movement of the closure element toward the valve seat by an amount corresponding to the amount by which the first fluid chamber is decreased, whereby the internal volume of the valve remains substantially the same during activation of the valve.

9. A valve according to claim 8, wherein the means for increasing the volume of the second fluid chamber during relative movement of the closure element toward the valve seat by an amount corresponding to the amount by which the first fluid chamber is decreased comprises a first annular wall surrounding the fluid passageway adjacent the annular valve seat, and a second annular wall surrounding a fluid passageway communicating with the second fluid chamber, the transverse cross-sectional areas of the first and second annular walls being substantially equal.

10. A valve according the claim 8, wherein the actuator means includes fluid inlet and outlet means in the piston chamber between the piston and the piston chamber to permit fluid under pressure to be introduced into the piston chamber to move the piston.

* * * * *

UNITED STATES PATENT AND TRADEMARK OFFICE
CERTIFICATE OF CORRECTION

PATENT NO. : 4,830,331
DATED : May 16, 1989
INVENTOR(S) : Jorgen O. Vindum

It is certified that error appears in the above—identified patent and that said Letters Patent is hereby corrected as shown below:

Col. 2, line 48 - "an" should be "and"
Col. 3, line 12 - delete "and"
Col. 3, line 15 - insert "and" after the semicolon (;)
Claim 1, col. 7, line 43 - insert "a" before "fixed"
Claim 1, col. 7, line 45 - "extension" should be "extensions"
Claim 2, col. 8, line 23 - insert "of" before "the"
Claim 7, col. 9, line 44 - "b" should be "be"
Claim 8, col. 10, line 3 - delete "the", second occurrence.

Signed and Sealed this

Twenty-seventh Day of February, 1990

*Attest:*

JEFFREY M. SAMUELS

*Attesting Officer*     *Acting Commissioner of Patents and Trademarks*